(12) United States Patent
Etzion

(10) Patent No.: US 7,340,592 B1
(45) Date of Patent: Mar. 4, 2008

(54) EXECUTING A TRANSLATED BLOCK OF INSTRUCTIONS AND BRANCHING TO CORRECTION CODE WHEN EXPECTED TOP OF STACK DOES NOT MATCH ACTUAL TOP OF STACK TO ADJUST STACK AT EXECUTION TIME TO CONTINUE EXECUTING WITHOUT RESTARTING TRANSLATING

(75) Inventor: Orna Etzion, Haifa (IL)

(73) Assignee: Intel Corporation, Santa Clara, CA (US)

( * ) Notice: Subject to any disclaimer, the term of this patent is extended or adjusted under 35 U.S.C. 154(b) by 557 days.

(21) Appl. No.: 09/676,175

(22) Filed: Sep. 29, 2000

(51) Int. Cl.
*G06F 9/455* (2006.01)

(52) U.S. Cl. .................. 712/227; 712/202; 712/226; 712/234; 717/138

(58) Field of Classification Search ................ 717/136, 717/138, 139, 148; 712/202, 209, 226, 227, 712/234
See application file for complete search history.

(56) References Cited

U.S. PATENT DOCUMENTS

| | | | |
|---|---|---|---|
| 5,301,325 A | 4/1994 | Benson | |
| 5,577,233 A * | 11/1996 | Goettelmann et al. | 703/26 |
| 5,627,998 A | 5/1997 | Mondrik et al. | |
| 5,668,999 A | 9/1997 | Gosling | |
| 5,740,441 A | 4/1998 | Yellin | |
| 5,790,778 A | 8/1998 | Bush et al. | |
| 5,930,509 A | 7/1999 | Yates et al. | |
| 6,091,897 A | 7/2000 | Yates et al. | |
| 6,125,439 A | 9/2000 | Tremblay et al. | |
| 6,134,573 A * | 10/2000 | Henry et al. | 708/510 |
| 6,314,558 B1 | 11/2001 | Angel et al. | |
| 6,725,361 B1 * | 4/2004 | Rozas et al. | 712/222 |

OTHER PUBLICATIONS

Flynn, Michael J., Computer Architecture, Pipelined and PArallel Processor Design, 1995, Jones and Bartlett Publishers, p. 492.*

* cited by examiner

*Primary Examiner*—Tonia L. Meonske
(74) *Attorney, Agent, or Firm*—Blakely, Sokoloff, Taylor & Zafman LLP

(57) ABSTRACT

A method of generating an expected TOS during translation of instructions. The method includes translating a first block of instructions executable in a first processor architecture, into a translated first block of instructions executable in a second processor architecture, wherein the translated first block of instructions operate with a stack of data entry positions. During the translation, an expected Top of Stack (TOS) position in the stack for the first block of code is generated.

15 Claims, 4 Drawing Sheets

EXECUTING A TRANSLATED BLOCK OF INSTRUCTIONS AND BRANCHING TO CORRECTION CODE WHEN EXPECTED TOP OF STACK DOES NOT MATCH ACTUAL TOP OF STACK TO ADJUST STACK AT EXECUTION TIME TO CONTINUE EXECUTING WITHOUT RESTARTING TRANSLATING

FIELD OF THE INVENTION

The present invention relates to the field of computers. In particular the present invention discloses a method and apparatus for generating an expected Top of Stack during instruction translation.

BACKGROUND OF THE INVENTION

New computer architecture designs continue to improve the processing performance of computer processors. However, the existing computer programs often cannot be directly executed on new computer architectures.

To execute computer programs written for older computer processor architectures on a newer computer processors architectures, computer systems may perform binary translation. A binary translator translates blocks of code written for older processor architecture into equivalent blocks of code that can be executed on a newer processor architecture. The translation can be done "on the fly" (i.e., while executing the older architecture code). Translation could also be done before execution.

Binary translators typically insert extra instructions as necessary to ensure the instructions written for the older processor architecture will function properly on the newer processor architecture. Since the extra instructions added are not directly related to the goal of the original program, these extra instructions are "overhead" code that reduces performance. It would be desirable to implement translators in a manner that reduces the amount of overhead code.

DETAILED DESCRIPTION

Figure 1:
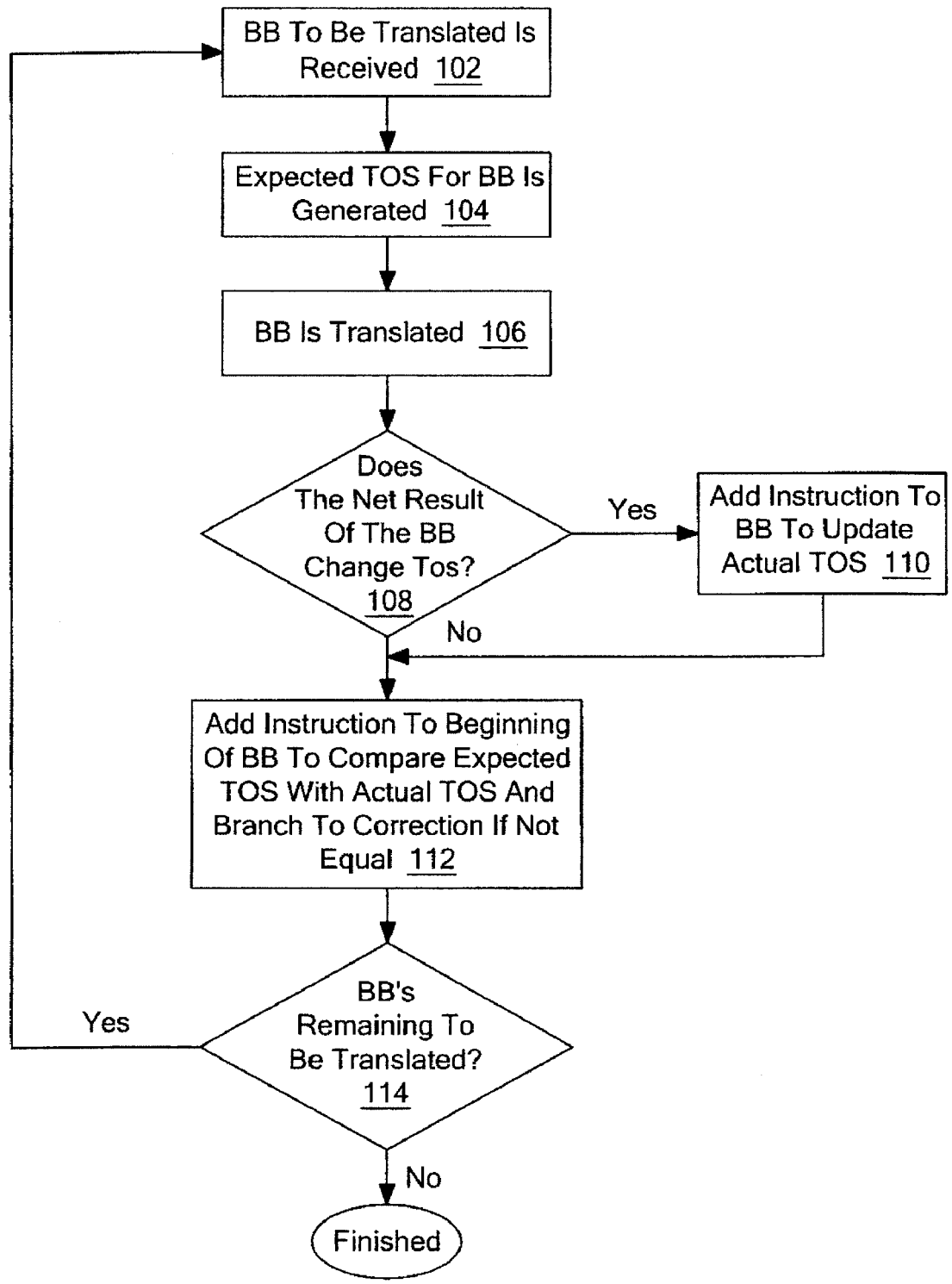
FIG. 1 is a flow diagram describing the steps of generating an expected top of stack (TOS) during binary translation according to one embodiment.

A method and apparatus for generating an expected top of stack (TOS) during translations is disclosed. In the following description, for purposes of explanation, specific nomenclature is set forth to provide a thorough understanding of the present invention. However, it will be apparent to one skilled in the art that these specific details are not required in order to practice the present invention.

As previously set forth, legacy applications that were written for an older processor architecture can be run on a new processor architecture by having instructions translated.

During translation, "overhead" code is typically added to have the applications executable on the new processor architecture. The present invention provides a technique for reducing the overhead.

In particular, programs commonly use a technique referred to as stacks when operating on multiple units of data. Stacks are typically Last In First Out (LIFO) based (i.e., the most recent data operand placed (pushed) onto the stack is the first item removed (popped) from the stack). Moreover, the most recent data operand pushed onto the stack is also referred to as the top of the stack (TOS). Stacks can be implemented in reserved area of memory or may be implemented using a set of registers.

By way of example, a stack may include five entries (ST0-ST4). Initially, the stack is empty. An instruction may perform an operation and push the result onto the stack at ST0. A second instruction may push a second result onto the stack at ST1. A third instruction may perform a third operation that involves using the most recent entry of the stack (ST1) (i.e., the TOS). As a result, the third instruction pops the result stored at ST1. Therefore, following the third instruction, the TOS is ST0.

Moreover, instructions for older processor architecture that refer to the stacks commonly use instructions that are TOS based. They do not refer to specific stack positions, but refer to TOS, TOS-1 etc. In such an embodiment, the processor includes logic to maintain/keep track of the current TOS position (i.e., knowing which of the physical entries (e.g., ST0-ST4) is currently the TOS).

As such, the TOS is maintained as execution of the program proceeds from one block of instructions (BB1) to a second block of instructions (BB2). A block of instructions typically consists of a sequence of contiguous instructions that ends in a branch instruction, which if taken passes execution to a second block instructions that typically does not immediately follow in the sequence of instructions in the program.

For example, an "in-order" sequence of a program may consist of BB1, BB2, BB3, BB4 . . . If the branch instruction of BB1 is taken, the flow of execution may be specified to jump to BB3 (or another BB that does not immediately follow BB1 in the sequence of BBs in the application program). If the branch instruction of BB1 is not taken, then execution would presumably continue at BB2. Moreover, when jumping from BB1 to BB3 (for example), the TOS continues to be maintained by the processor (in the case of the older processor architecture), so that BB3 may use the stack, by simply making reference to the TOS.

Some new processor architectures, however, may not provide automatic tracking of the TOS (as described above for the older processor architecture). As a result, rather than simply pushing and poping operands on/off a stack by referring to the TOS (without having to identify the actual physical entry/position of the TOS), the instructions make specific reference to the physical location of the TOS. More specifically, consider the example of a set of registers being set aside for the stack, but no logic of the processor monitors which register contains the current TOS. Therefore, the instructions for the new processor architecture specify the register from which data is to be removed (i.e., popped), rather than simply requesting the data at the TOS be popped, as in the case of the instructions executable on the older processor architecture.

As a result, when translating instructions from being executable on the older processor architecture (which made reference to the TOS), the translated instructions make specific reference to the register/memory location that is assumed to be the TOS. Moreover, the translated BBs, previously, would make the assumption that the TOS remained the same (i.e., the net result of a preceding BB's did not increase or decrease the position of the TOS). However, the assumption that the TOS has not changed is relatively frequently incorrect. As a result, before a translated BB could be executed, the stack would need to be rotated to have the actual TOS correspond to the expected TOS (which results in overhead). The stack would need to be rotated because the translated instructions have already been translated to make reference to specific locations that were believed to be the TOS.

In one embodiment of the present invention, however, during the translation of a program, an expected TOS for each respective BB is generated. By generating, during translation, an expected TOS for a BB, less overhead is incorporated into the actual execution of the translated BB. In particular, at the time of executing the translated BB, there is a greater likelihood that the expected TOS will match the actual TOS, thereby avoiding the need to rotate the stack to have the expected TOS match the actual TOS.

Generating Expected TOS During Translation

FIG. 1 is a flow diagram describing the steps of generating an expected TOS during translation according to one embodiment. In block 102, a block of instructions (BB) is received/identified to be translated from being executable on a first processor architecture into instructions executable on a second processor architecture.

In block 104 of the flow diagram, the expected TOS for the respective BB, is determined. In one embodiment, a dynamic translator uses the first run-time entry state, which is already known when the respective block is about to be translated. In case of a static translator, the expected TOS, in one embodiment, is determined by a instruction analyzer counting the number of times data is pushed onto the stack, and the number of times data is removed/popped from the stack.

In block 106, the BB identified/received to be translated is translated from being executable on a first processor architecture into instructions executable on a second processor architecture. The translation may be done dynamic or via a static binary translator. Moreover, in alternative embodiments, architectural simulators or virtual-machine implementations using similar, code-generation-based techniques, may also be used to transform the basic blocks of instructions, without departing from the invention.

In block 108, it is determined whether the net result of the respective BB changes the TOS. If the net result of the respective BB is to change the TOS (by increasing or decreasing the position of the TOS), in block 110 at least one instruction is added to the end of the BB to update the actual TOS accordingly. In one embodiment, the actual TOS can be stored in a register. On the other hand, if the net effect of the respective BB is to not change the TOS, then the additional instruction to update the actual TOS is not added.

In block 112, an instruction is added to the beginning of the present BB being translated, to compare the expected TOS with the Actual TOS. If the expected TOS is not equal to the Actual TOS, a TOS correction handler is called to correct the actual TOS to be aligned with the expected TOS. In one embodiment, the correction handler includes generating the delta of the expected TOS and the actual TOS. The stack is then adjusted/rotated by the delta.

As a result, the penalty of the difference between the actual TOS and the expected TOS does not propagate to subsequent BBs. When execution proceeds to the next BB to be executed, the correction of the actual TOS is already done, and the stack-depth expected by the next BB should match the actual depth. In the present invention, by generating an expected TOS during translation, the likelihood of the expected TOS and actual TOS not matching is reduced. As a result, the need to rotate the actual stack during execution is reduced.

Thereafter, in block 114, if additional BBs remain to be translated, the translator continues to repeat blocks 102-112 for the remaining BBs that are to be translated.

Figure 2:
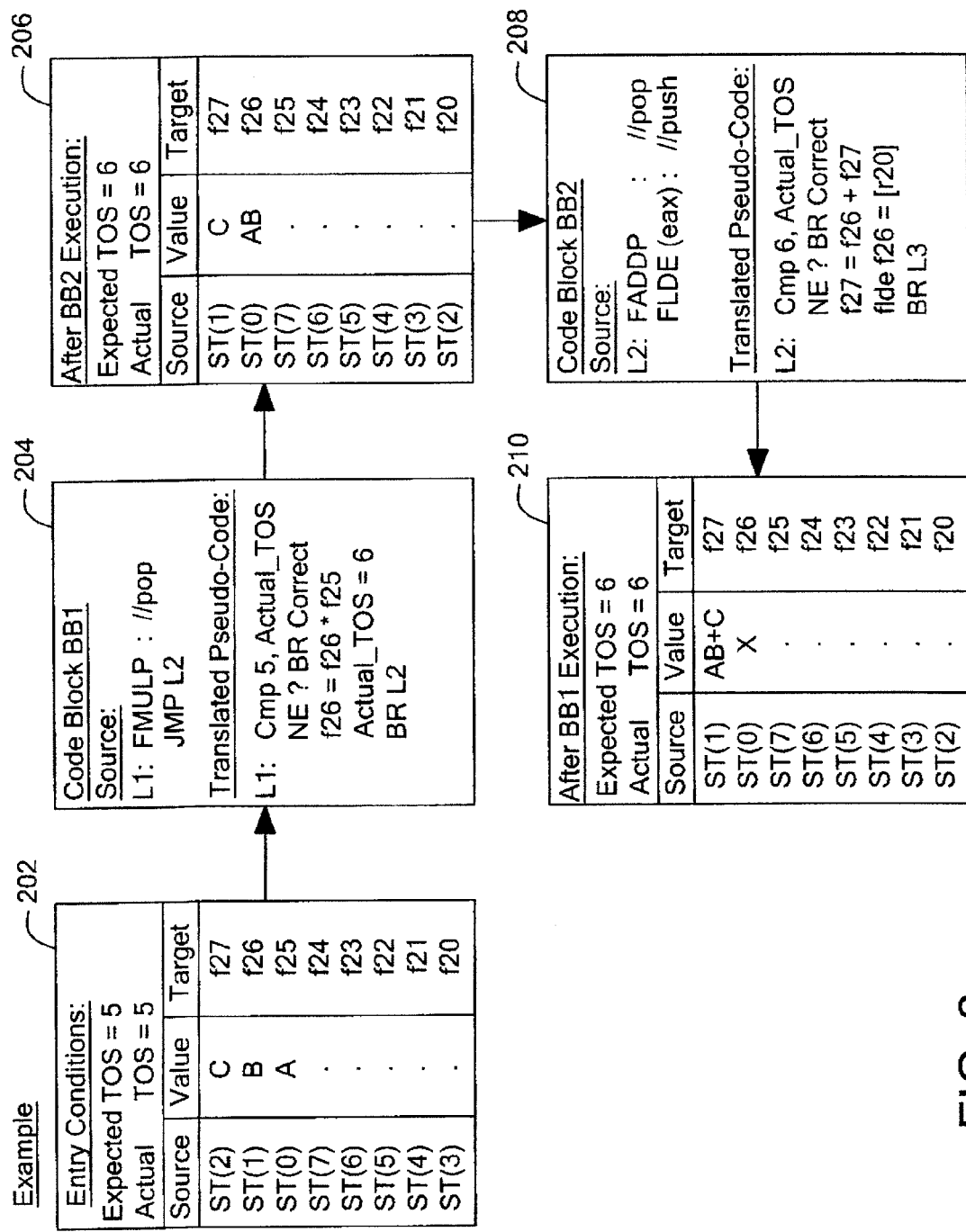
FIG. 2 is a block diagram illustrating binary translated pseudo code that includes an expected TOS in accordance with one embodiment.

FIG. 2 illustrates a pseudo code example of one embodiment where the expected TOS is equal to the Actual TOS. In block 202, the entry conditions for BB1 are presented. In the entry conditions, the expected TOS for BB1 is 5, as is the actual TOS. The translated pseudo-code of BB1, shown in block 204, includes the compare instruction to determine if the expected TOS is equal to the Actual TOS. If the expected TOS is not equal to the actual TOS, the correction handler is called to correct the actual TOS by rotating the stack accordingly.

On the other hand, if the Actual and expected TOS are equal, the instructions of BB1 are executed. Afterwards, the updated TOS as generated by the execution of the instructions in BB1 is assigned as the Actual TOS. In the case BB1, of the net effect of the code is to push one additional data entry onto the stack. Thus, following execution of BB1, as shown in block 206, the expected TOS is 6 and the Actual TOS is 6.

Execution of the program continues at the translated BB2 as shown in block 208. Execution of BB2 generates the conditions as shown in block 210. Moreover, in block 208, the net use of the stack does not change the TOS. Thus, the actual TOS is not changed (i.e., BB2 pops an entry from the stack and pushes an entry onto the stack).

Figure 3:
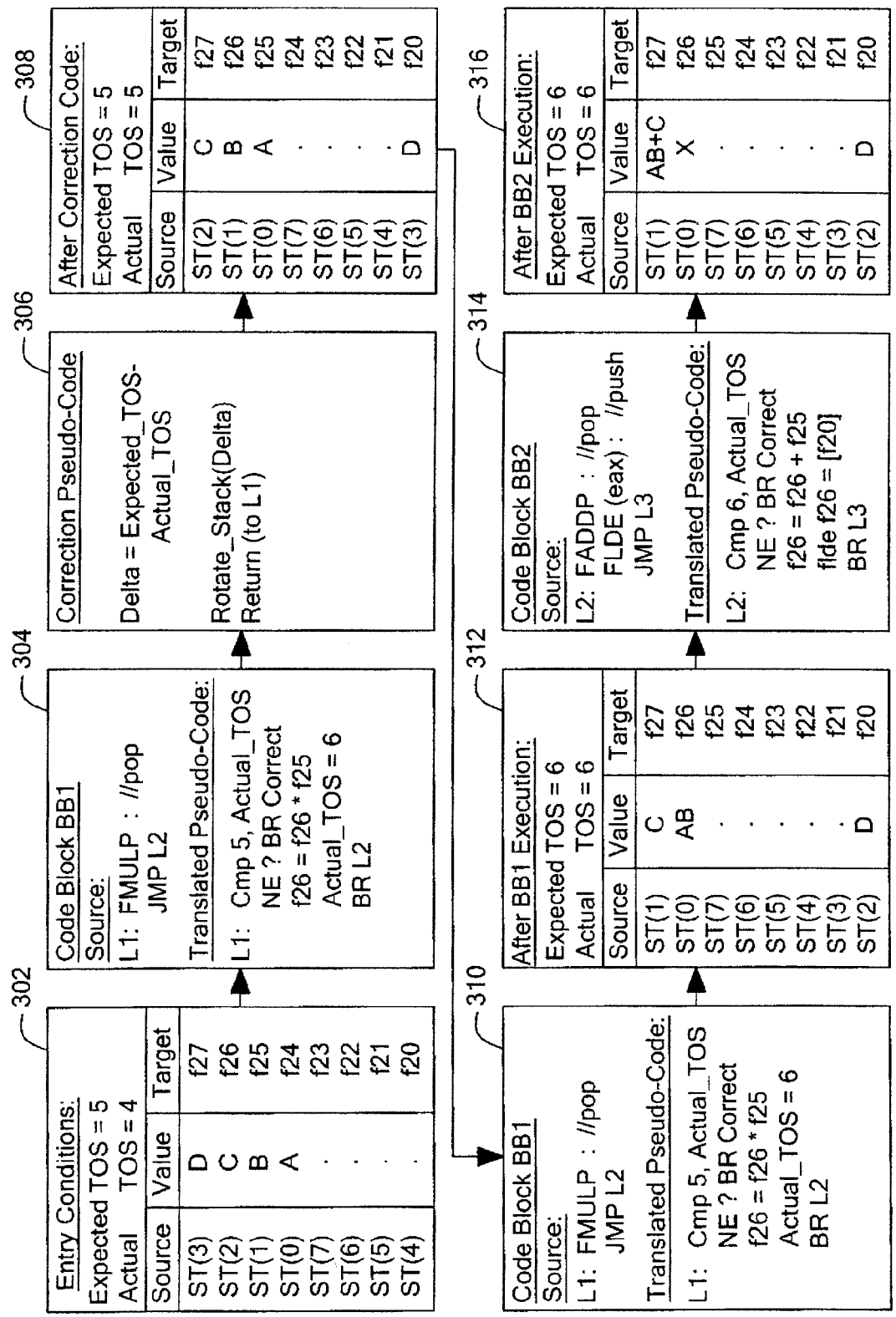
FIG. 3 is a block diagram illustrating binary translated pseudo code that includes an expected TOS in accordance with one embodiment.

FIG. 3 further illustrates an additional pseudo code example of one embodiment where the expected TOS does not equal to the Actual TOS. In block 302, the entry condition of BB1 is presented. In the entry condition, the expected TOS is 5, and the actual TOS is 4. In block 304, the first line of the translated pseudo code of BB1 compares the expected TOS with the actual TOS. Because the they are not equal, the correction pseudo code in block 306 is called to correct the actual TOS as shown in block 308. Thereafter, execution of BB1 proceeds as shown in block 310.

Once again, the pseudo code of BB1 Generates a net of adding one entry to the stack. Thus, the actual TOS is updated to 6, at the end of BB1, block 312. In block 314, the result of the pseudo code of BB2 does not change TOS. Thus, the actual TOS is not changed, as shown in block 316.

The foregoing has described a method and apparatus for generating an expected TOS during binary translation. It is contemplated that changes and modifications may be made by one of ordinary skill in the art, to the materials, arrangements, and code listings of the present invention without departing from the scope of the invention. For example, the methods as described above, including the methods of generating an expected TOS, in one embodiment, could be performed when compiling source code in prior to executing the source code.

Figure 4:
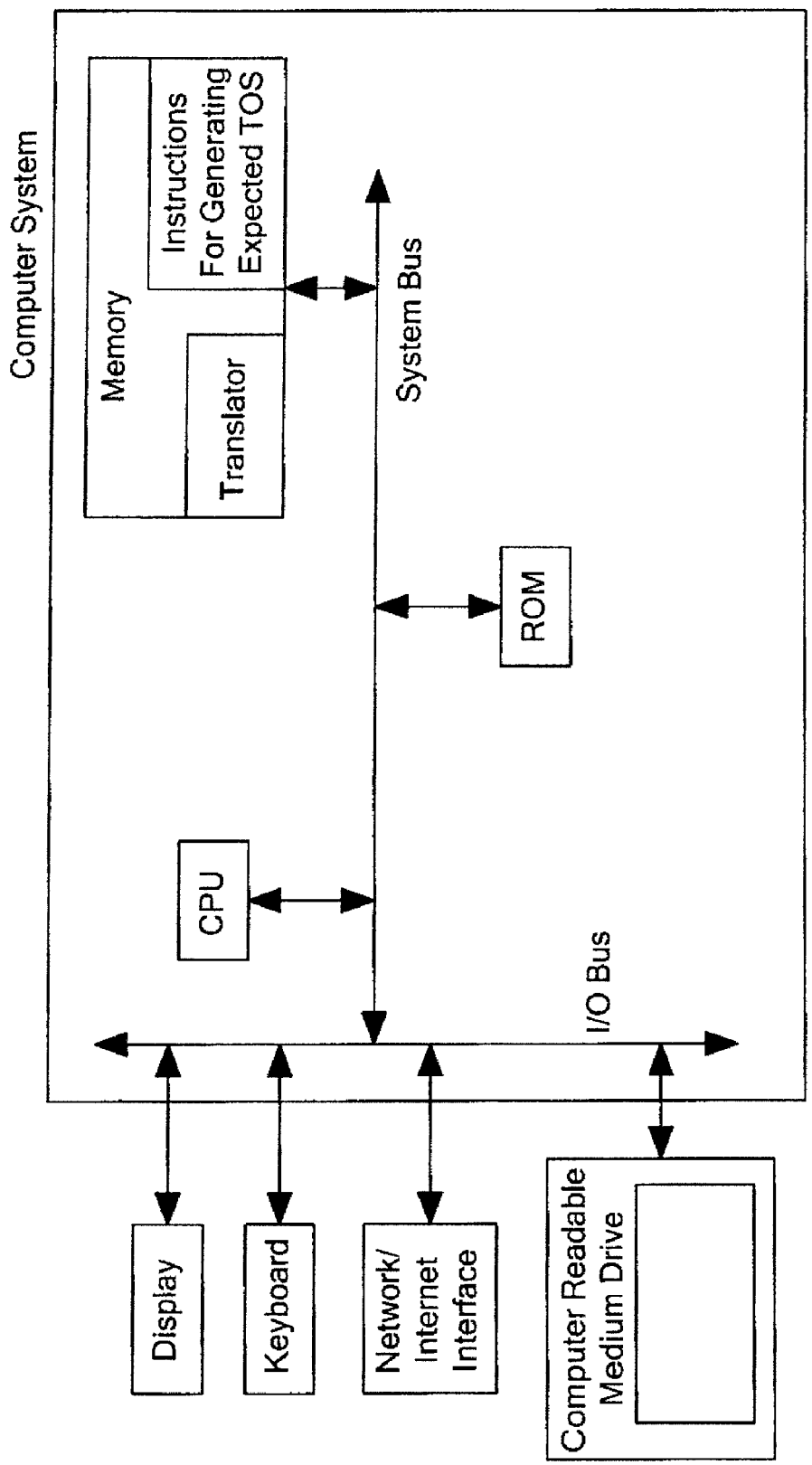
FIG. 4 illustrates a computer system having a computer readable medium with instructions stored thereon according to one embodiment.

In addition, the methods as described above, can be stored in memory of a computer system as a set of instructions to be executed. In addition, the instructions to perform the methods as described above could alternatively be stored on other forms of computer-readable medium, including magnetic and optical disks. For example, method of the present invention can be stored on computer-readable mediums, such as magnetic disks or optical disks, that are accessible via a disk drive (or computer-readable medium drive), such as the disk drive shown in FIG. 4.

Alternatively, the logic to perform the methods as discussed above, including the methods of generating an expected TOS during binary translation, could be implemented in discrete hardware components such as large-scale integrated circuits (LSI's), application-specific integrated circuits (ASIC's) or in firmware such as electrically erasable programmable read-only memory (EEPROM's).

We claim:

1. A method of translating instructions, said method comprising:

translating a first block of instructions executable in a first processor architecture into a translated first block of instructions executable in a second processor architecture, said translated first block of instructions operating with a stack of data entry positions;

during the translating, generating an expected Top of Stack (TOS) position in said stack for said first block of instructions;

during the translating, adding at least one instruction to said translated first block of instructions to determine if a first expected TOS is equal to an actual TOS position in said stack at a time of executing said translated first block of instructions; and executing said translated first block of instructions without restarting the translating, wherein during the executing said at least one instruction to branch to correction code if said expected TOS is not equal to said actual TOS, said correction code to generate a delta of said expected TOS and said actual TOS and to adjust said stack for said first block of instructions by said delta at the time of executing said translated first block of instructions;

wherein said translated first block of instructions to continue executing after said at least one instruction adjusts said stack.

2. The method as claimed in claim 1, said method further comprising:

determining if execution of instructions in said first block of instructions changes the actual TOS.

3. The method as claimed in claim 2, said method further comprising:

in response to determining execution of instructions in said first block of instructions changes the actual TOS, adding an instruction to an end of the first block of instructions to update the actual TOS.

4. The method as claimed in claim 3, wherein to update the actual TOS results in an expected TOS corresponding to a second block of instructions matching the actual TOS, said second block of instructions following said first block of instructions in execution and further operating with said stack.

5. The method as claimed in claim 1, wherein to adjust said stack for said first block of code by the delta includes rotating said stack by the delta.

6. A computer-readable medium having stored thereon a set of instructions to translate instructions, said set of instructions, which when executed by a processor, cause said processor to perform a method comprising:

translating a first block of instructions executable in a first processor architecture into a translated first block of instructions executable in a second processor architecture, said translated first block of instructions operating with a stack of data entry positions;

during the translating, generating an expected Top of Stack (TOS) position in said stack for said first block of instructions;

during the translating, adding at least one instruction to said translated first block of instructions to determine if a first expected TOS is equal to an actual TOS position in said stack at a time of executing said translated first block of instructions; and executing said translated first block of instructions without restarting the translating, wherein during the executing said at least one instruction to branch to correction code if said expected TOS is not equal to said actual TOS, said correction code to generate a delta of said expected TOS and said actual TOS and to adjust said stack for said first block of instructions by said delta at the time of executing said translated first block of instructions;

wherein said translated first block of instructions to continue executing after said at least one instruction adjusts said stack.

7. The computer-readable medium as claimed in claim 6, wherein said set of instructions further includes additional instructions, which when executed by said processor, cause said processor to perform said method further comprising:

determining if execution of instructions in said first block of instructions changes the actual TOS.

8. The computer-readable medium as claimed in claim 7, wherein said set of instructions further includes additional instructions, which when executed by said processor, cause said processor to perform said method further comprising:

in response to determining execution of instructions in said first block of instructions changes the actual TOS, adding an instruction to an end of the first block of instructions to update the actual TOS.

9. The computer-readable medium as claimed in claim 8, wherein to update the actual TOS results in an expected TOS corresponding to a second block of instructions matching the actual TOS, said second block of instructions following said first block of instructions in execution and further operating with said stack.

10. The computer-readable medium as claimed in claim 6, wherein to adjust said stack for said first block of code by the delta includes rotating said stack by the delta.

11. A system comprising:

a first unit of logic to translate a first block of instructions executable in a first processor architecture into a translated first block of instructions executable in a second processor architecture, said translated first block of instructions operating with a stack of data entry positions;

a second unit of logic to generate an expected Top of Stack (TOS) position in said stack for said first block of instructions, wherein said second unit of logic further adds at least one instruction to said translated first block of instructions to determine if a first expected TOS is equal to an actual TOS at a time of executing said translated first block of instructions; and a third unit of logic to execute said translated first block of instructions without the first unit of logic restarting the translation, wherein during the execution said at least one instruction to branch to correction code if said expected TOS is not equal to said actual TOS, said correction code to generate a delta of said expected TOS and said actual TOS and to adjust said stack for said first block of instructions by said delta at the time of executing said translated first block of instructions;

wherein said translated first block of instructions to continue executing after said at least one instruction adjusts said stack.

12. The system as claimed in claim 11, wherein said second unit of logic determines if execution of instructions in said first block of instructions changes the actual TOS.

13. The system as claimed in claim 12, wherein said second unit of logic, in response to determining execution of instructions in said first block of instructions changes the actual TOS, adds an instruction to an end of the first block of instructions to update the actual TOS.

14. The system as claimed in claim 13, wherein to update the actual TOS results in an expected TOS corresponding to a second block of instructions matching the actual TOS, said second block of instructions following said first block of instructions in execution and further operating with said stack.

15. The system as claimed in claim 11, wherein to adjust said stack for said first block of code by the delta includes rotating said stack by the delta.

* * * * *